March 15, 1955  A. FEUCHT  2,704,203
SUPPORTING AND FEEDING DEVICE FOR ROCK DRILLS
Filed Jan. 17, 1951
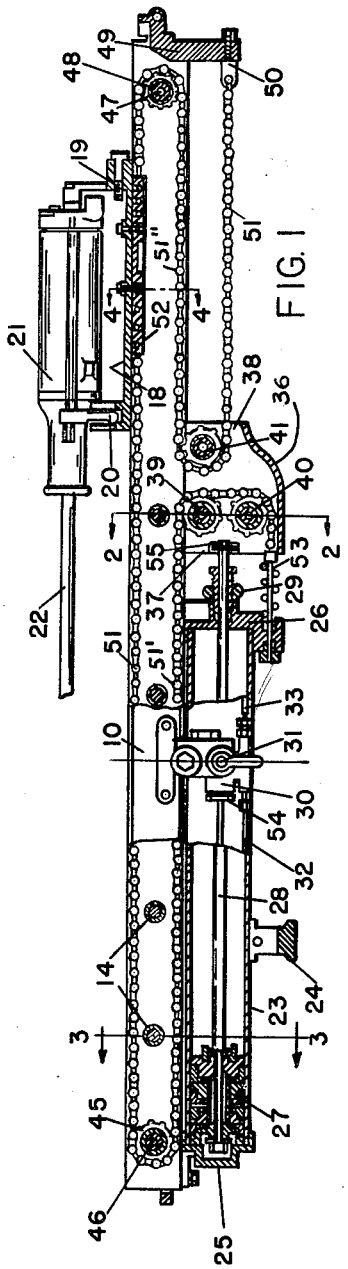
INVENTOR.
ALBERT FEUCHT
BY
ATTORNEY

United States Patent Office 2,704,203
Patented Mar. 15, 1955

2,704,203

SUPPORTING AND FEEDING DEVICE FOR ROCK DRILLS

Albert Feucht, Garfield Heights, Ohio, assignor, by mesne assignments, to Westinghouse Air Brake Company, a corporation of Pennsylvania Application January 17, 1951, Serial No. 206,415

2 Claims. (Cl. 255—45)

This invention relates broadly to rock drills, but more particularly to a fluid actuated feeding mechanism for rock drills of the drifter type.

One object of this invention is to produce a rock drill support including a simple and efficient feed mechanism through which the rock drill may be advanced to or retracted from the work or surface being drilled.

Another object of this invention is to produce a simple feed mechanism including a feed cylinder having a power actuated piston slidable therein and connected to the rock drill in a manner enabling the latter to travel at twice the speed of the piston, thereby enabling the feed cylinder to be substantially one half the length of possible travel of the rock drill.

These objects are accomplished by a construction free of complication, and by an arrangement of parts resulting in a compact unit which is strong, durable and efficient.

In the accompanying drawings,

Figure 1 is a side view, partly in section, of a rock drill support showing a rock drill feeding mechanism embodying the invention.

Figs. 2, 3 and 4 are enlarged cross-sectional views taken on lines 2—2, 3—3 and 4—4 respectively in Fig. 1, and turned 90° from their position in Fig. 1.

Figure 5 is a partial side view, corresponding to Figure 1, showing the pressure conveying conduits leading from the valve to the ends of the feed cylinders.

Referring to the drawings, 10 designates the drill support which is made of two channel-bars of U-shaped cross section 11 and 12. The two bars are mounted back to back but laterally spaced by sleeves 13 interposed therebetween and fitting on cross bolts 14 which extend transversely through the bars 11 and 12 and cooperate with nuts 15 for rigidly clamping the bars on the sleeves 13 and against relative movement. As shown in Figure 1, the sleeves or spacers 13 and bolts 14 are longitudinally spaced along the full length of the bars, thereby resulting in a rigid drill support 10.

The upper flanges of the channel-bars 11 and 12, which extend in opposite directions, form parallel guides 16 extending the full length of the support. Fitting over the guides 16 in slidable relation therewith, there are the guideways 17 of a cradle 18, which is thus capable of guided longitudinal movement on the support 10. To the cradle 18 is rigidly secured by any suitable means such as bracket 19 and clamp 20, a drilling motor, which with the cradle 18 is hereinafter referred to as a rock drill 21. This rock drill is of standard construction, capable of delivering a succession of impacts to a drill steel 22 protruding from the front end thereof for drilling holes in the rock or surface being drilled. This surface is generally located adjacent the left end of the support as seen in Figure 1, which left end is generally referred to as the front end of the support and the opposite end, the rear end.

Rigidly secured to the support 10 by any suitable means, and located under it, there is a feed cylinder 23 which extends from the front of the support toward the rear, a distance substantially equal to one-half the length of the support. The feed cylinder has the usual conical projection 24 for mounting the entire assembly on a wagon drill, quarry bar or the like, not shown. The front end of the cylinder 23 is closed by a cap 25 and its back end by a similar cap 26. A piston assembly 27 is reciprocable in cylinder 23, and has a piston rod 28 extending through a packing box 29 provided in the back cap 26. Reciprocation of the piston 27 in the cylinder 23 is effected by motive fluid such as compressed air supplied to a valve housing 30, which housing is rigidly secured to the outside of the cylinder 23. A two way throttle valve 31 operatively fitted in the housing 30 may be operated for admitting motive fluid either in the front end of the cylinder through a conduit 32, or to the back end through a conduit 33.

The lower flanges of the channel-bars 11 and 12 from the rear end 26 of the cylinder 23 and the rear end of the support 10, also form guides 34 on which fit the guideways 35 of a housing 36 depending therefrom. This housing 36 is clamped, as at 55, to the free end of the piston rod 28 for movement therewith. By virtue of the guides 34 and guide-ways 35, the housing 36 is slidably carried by the support 10 in guided relationship therewith.

As shown in Figure 2, the housing 36 is substantially of rectangular cross section and has its upper end 9 as well as both its front and back ends 37 and 38 opened as clearly shown in Figure 1, the back end being smaller than the front end. Located in the housing 36, are three sprocket-wheels 39, 40 and 41 of equal diameters. The sprocket-wheels 39 and 40 are superposed in the same vertical plane, while the wheels 39 and 41 are located side by side within the same horizontal plane. Each sprocket-wheel is mounted on a shaft or spindle 42 which extends perpendicularly through the side walls of the housing 36 and is retained in position by a head 43 engaging one side wall and a nut 44 engaging the other. Located between the channel-bars 11 and 12 near the front end of the support 10, there is another sprocket-wheel 45 rotatable on a spindle 46 corresponding to the spindles 42, and similarly mounted on a spindle 47 near the back end of the support 10, there is another sprocket-wheel 48.

Depending from the back end of the support 10 where it is rigidly secured, there is a bracket 49 having affixed thereto by a bolt 50 one end of a sprocket chain 51. From the bracket 49, the chain extends forwardly over the sprocket 41 and therefrom rearwardly over the support rear sprocket 48. From this last sprocket, the chain extends forwardly and is rigidly secured to the cradle 18 by any suitable means such as a clamp 52. From the cradle 18, the chain extends forwardly over the support front sprocket 45, rearwardly over the sprocket 39 through the upper open end 9 of the housing 36, downwardly over the sprocket 40 and from there forwardly again through the housing opening 37 for connection with the cylinder rear cap 26 through a chain tension adjusting bolt 53.

The operation of the feeding mechanism is as follows: assuming the rock drill 21 in the position shown in Figure 1, motive fluid admitted into the valve casing 30 through the connection 54 may, through the throttle valve 31, be directed to the front end of the cylinder 23 through the conduit 32. Motive fluid in the front end of the cylinder 23 will effect rearward movement of the piston 27 and rod 28, and the consequential rearward slidable movement of the housing 36 on the support lower guides 34. Rearward movement of the housing 36 and its sprocket wheels 39 and 40 will, by virtue of the chain 51 extending over the sprocket wheels 39 and 40 in double-back relationship, effect forward movement of the chain section 51' at twice the speed of the piston 27, thereby feeding the rock drill 21 to the work at a greater rate of speed than that of the feed piston. During this forward feeding of the rock drill 21, the sprocket wheel 41 also carried by the housing 36 and slidable rearwardly therewith, together with the support rear sprocket-wheel 48, act as idlers for the chain section extending from the bolt 50 to the rock drill 21.

When it is desired to feed the rock drill 21 rearwardly or away from the work, the throttle valve 31 may be positioned to admit motive fluid to the rear end of the feed cylinder 23 through the conduit 33. In this instance, the motive fluid will effect forward movement of the piston 27 and piston rod 28, and the consequential forward movement of the housing 36 on the lower guides 34 of the support 10. The sprocket-wheel 41 carried by the housing 36 will of course move forwardly therewith, causing, by virtue of the chain 51 extending over it in double-back relationship, rearward movement of the chain section 51″ at twice the speed of the housing 36, thereby feeding the rock drill 21 away from the work at a greater rate of speed than that of the feed piston 27. During this rearward feeding of the rock drill 21, the sprocket-wheels 39–40 carried by the housing 36 and slidable rearwardly therewith, together with the support front sprocket-wheels 45, act as idlers for the chain section extending from the bolt 53 to the rock drill cradle 18.

From the foregoing, it will be understood that the support upper flanges 16 act as supporting and guiding runways for the rock drill, while the lower flanges 34 act as supporting and guiding runways for the housing 36, in which are mounted the three sprocket-wheels 39, 40 and 41, and the free end of the piston rod 28. In practice it has been found that this arrangement of parts resulted in a very rigid assembly, having a longer length of service than fluid actuated feeding mechanisms heretofore used for feeding rock drills of the drifter type.

The details of structure and arrangement of parts shown and described may be variously changed and modified without departing from the spirit and scope of the invention.

I claim:

1. In combination, a rock drill, an elongated support formed of two channel-bars mounted back to back in lateral spaced relationship and having upper juxtaposed flanges extending in opposite directions and lower flanges of equal disposition, said rock drill being carried by said upper flanges for slidable guided movement thereon, a feed cylinder extending rearwardly from the support front end, a piston in the cylinder having a rod extending through the rear end thereof, means for selectively admitting motive fluid into opposite ends of said cylinder for effecting forward and rearward movement of the piston and rod, an open ended sprocket wheel housing below said support having guide-ways fitted on said lower flanges by which said housing is carried by the support for longitudinal movement thereon between the rear ends of said cylinder and support, a connection between said piston rod and housing, a plurality of sprocket wheels rotatably carried by said housing for slidable movement therewith, a front and rear sprocket wheel rotatably carried by said support adjacent the front and rear ends thereof, and means for transmitting forward and rearward movement of said piston and rod to the rock drill including a chain secured to the rear end of the support extending forwardly therefrom over a sprocket wheel in said housing, rearwardly over said support rear sprocket wheel, forwardly to the rock drill where it is rigidly secured, forwardly from the rock drill over said support front sprocket wheel, rearwardly over other sprocket wheels in said housing and therefrom forwardly to the cylinder rear end where it is attached.

2. In combination, a rock drill, an elongated support having a pair of parallel upper guides longitudinally thereof and a pair of lower guides of equal disposition, said rock drill being carried by said support for slidable guided movement on said upper guide, a feed cylinder fixed below said support and extending rearwardly from the front end thereof, a piston in the cylinder, means for selectively admitting motive fluid into opposite ends of said cylinder for effecting forward and backward movement of the piston, a sprocket wheel housing below said support, guideways on said housing fitted over said lower guides through which said housing is carried by the support for longitudinal guided movement relative thereto, a front and rear sprocket wheel rotatably carried by said support adjacent the front and rear ends thereof, a plurality of sprocket wheels rotatably carried in said housing for slidable movement therewith, movement transmitting means between said piston and housing, and a chain secured to said rock drill having one end section affixed to the rear end of said support and doubling back therefrom over a sprocket wheel within said housing and over said rear sprocket wheel and another end section affixed to one end of said cylinder and doubling back therefrom over other sprocket wheels within said housing and over said front sprocket wheel.

References Cited in the file of this patent

UNITED STATES PATENTS

| | | |
|---|---|---|
| 1,834,701 | Gustafson | Dec. 1, 1931 |
| 1,844,157 | Gustafson | Feb. 9, 1932 |
| 1,844,873 | Smith | Feb. 9, 1932 |
| 2,088,649 | Hart | Aug. 3, 1937 |
| 2,097,561 | Curtis | Nov. 2, 1937 |
| 2,309,077 | Osgood | Jan. 19, 1943 |